United States Patent [19]

Maglio et al.

[11] Patent Number: 4,521,479
[45] Date of Patent: Jun. 4, 1985

[54] SURFACE TREATMENT FOR TACK REDUCTION OF ELASTOMER SURFACES

[75] Inventors: Ralph A. Maglio, Wadsworth; John W. Fieldhouse, Mogadore, both of Ohio

[73] Assignee: The Firestone Tire & Rubber Company, Akron, Ohio

[21] Appl. No.: 498,380

[22] Filed: May 26, 1983

[51] Int. Cl.³ .................. B32B 23/04; B32B 25/04
[52] U.S. Cl. ........................... 428/326; 427/180; 428/507
[58] Field of Search .............. 428/326, 507, 496; 427/180

[56] References Cited

U.S. PATENT DOCUMENTS 3,592,725  7/1971  Yoshimura et al. ............... 428/326

Primary Examiner—George F. Lesmes
Assistant Examiner—P. R. Schwartz
Attorney, Agent, or Firm—Frank J. Troy, Sr.

[57] ABSTRACT

A method for reducing the surface tack of EPDM and related elastomers is provided. The method involves coating the surfaces of the elastomer with particulate cellulose. Sheets of cellulose coated elastomer can be subjected to rolling up and curing operations without encountering surface sticking problems. In addition, the cellulose coated surfaces of the elastomer can be bonded together for the purpose of forming splices or seams without the necessity for first removing the cellulose coating.

8 Claims, No Drawings

SURFACE TREATMENT FOR TACK REDUCTION OF ELASTOMER SURFACES

BACKGROUND OF THE INVENTION

The invention relates to a method for reducing the surface tack of EPDM and related elastomers and to an EPDM elastomer having its surfaces coated with cellulose.

Uncured EPDM elastomers usually exhibit a sufficient degree of tack that if two surfaces of the uncured EPDM elastomer are brought into direct contact with each other, they will strongly adhere together. Thus, for example, if two sheets of uncured EPDM elastomer are brought into contact with each other, of if a sheet of uncured elastomer is wound up into a roll and the elastomer surfaces are permitted to remain in contact with each other for any significant period of time, it will be extremely difficult if not impossible to separate the sheets or unwind the roll. Such a problem is greatly magnified if the sheets or roll of elastomer are subjected to a curing procedure since the bond between the elastomer surfaces is greatly strengthened by curing.

In order to overcome the problem of EPDM elastomer surfaces adhering to each other during handling or after curing, it is necessary to apply a coating of an anti-sticking or lubricating agent to the elastomer surfaces. A number of such anti-sticking agents are known in the elastomer or polymer arts including talc, mica, starch and metal stearates. The most common anti-sticking agents used for elastomers are talc and mica. These materials effectively reduce the surface tension of the elastomer thereby reducing the tendency of the surfaces to stick together. Talc and mica strongly adhere to the elastomer surfaces but due to their lamellar structures permit the surfaces to slide past each other without sticking together.

As indicated, talc and mica are effective anti-sticking agents for EPDM elastomer surfaces. However, these materials exhibit a major disadvantage in certain EPDM elastomer applications. This disadvantage is particularly apparent in EPDM elastomers which are utilized for flat roofing applications. In such applications, it is usually necessary to splice two or more sheets of cured EPDM elastomer together with a contact adhesive in order to provide for complete coverage of the roof. However, talc and mica have been found to exert a negative effect on the peel adhesion of the splice or seam when a contact adhesive is used to splice the sheets of cured EPDM together. Thus, in order to achieve maximum lap splice strength it is necessary to completely remove the talc or mica from those portions of the elastomer surfaces which are to be spliced together. However, removal of the talc or mica is difficult and time consuming since these materials adhere strongly to the elastomer surfaces. As will be evident, the application of sheets of cured EPDM elastomer to flat roofs is a labor intensive operation. Accordingly, the necessity of completely removing the talc or mica is a significant disadvantage.

In view of the foregoing, the discovery of an anti-sticking agent which does not adversely affect the peel adhesion of EPDM splices, and therefore need not be removed or at least completely removed, would be a major achievement.

SUMMARY OF THE INVENTION

In accordance with the present invention, a method for reducing the tack of EPDM elastomer surfaces comprises coating the surfaces of the EPDM elastomer with particulate cellulose. The resultant cellulose coated EPDM elastomer can be subjected to various handling and curing operations without encountering surface sticking problems. Sheets of cellulose coated cured EPDM elastomer can be spliced together with a contact adhesive without the necessity for first removing the cellulose coating.

DETAILED DESCRIPTION OF THE INVENTION

The term "EPDM" as employed throughout the specification and claims is used in the sense of its definition as found in ASTM-D-1418-64 and is intended to mean a terpolymer of ethylene, propylene and a diene monomer.

EPDM terpolymers and illustrative methods for their preparation are described in various patents including U.S. Pat. No. 3,280,082 and British Pat. No. 1,030,289, the disclosures of which are incorporated herein by reference. The preferred terpolymers are those derived from a monomer mixture consisting of from about 40 to about 80 weight percent ethylene and from about 1 to about 10 weight percent of the diene monomer with the balance being propylene. Diene monomers which may be utilized in forming the terpolymers are preferably non-conjugated dienes. Illustrative examples of non-conjugated dienes which may be employed are dicyclopentadiene, alkyl dicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like.

A number of the above-described EPDM elastomers are commercially available. A typical commercial EPDM elastomer is Vistalon 2504, a terpolymer of 50 weight percent ethylene, 45 weight percent propylene and 5 weight percent 5-ethylidene-2-norbornene having a number average molecular weight ($\overline{M}_n$) as measured by GPC of about 47,000; a weight average molecular weight ($\overline{M}_w$) as measured by GPC of about 174,000 and a Mooney Viscosity (ML, 1+8, 100° C.) of about 40, available from Exxon Chemical Company. Another typical commercial EPDM elastomer is Nordel 1070, an ethylene/propylene/1,4-hexadiene terpolymer having an $\overline{M}_n$ of 87,000 and an $\overline{M}_w$ of 188,000 as determined by GPC, available from duPont.

As indicated, the surface tack of EPDM elastomers can be reduced in accordance with the method of the invention by coating the elastomer surfaces with particulate cellulose. Unlike talc and mica, cellulose has an amorphous structure and does not strongly adhere to itself or an elastomer surface except by entrapment. Accordingly, any excess cellulose applied to elastomer surfaces to prevent surface sticking during handling of the elastomer and during curing can be removed if desired by light brushing or other light mechanical action. Moreover, as mentioned heretofore it is not necessary to remove the cellulose coating during splicing of two elastomer surfaces together using a contact adhesive since cellulose does not adversely affect peel adhesion. Virtually any particulate cellulose can be employed to prevent sticking of the EPDM elastomer surfaces together. A preferred particulate cellulose is one having a particle size which will enable it to pass through a number 200 mesh screen.

The coating of particulate cellulose can be applied to the EPDM surfaces by any convenient method. Thus, for example, the particulate cellulose may be applied by dusting or brushing. Alternatively and often preferably, the particulate cellulose can be applied to the EPDM elastomer surfaces by passing a sheet of the elastomer through a suitable container (e.g., a trough) filled with particulate cellulose.

The following examples are submitted for the purpose of further illustrating the nature of the present invention and are not to be regarded as a limitation on the scope thereof.

In the examples, a series of trial runs were conducted to evaluate the effect of cellulose in preventing sticking of EPDM elastomer surfaces to each other or to other substrates during processing and curing. The effect of cellulose on the peel adhesion of splices formed by bonding cellulose coated EPDM elastomer surfaces together using a contact adhesive was also evaluated. For comparative purposes, in some of the examples talc was subjected to the same tests.

RUN #1

Two (2) uncured sheets of EPDM elastomer of the Nordel type, 6"×6"×0.060" were coated on each side with #200 mesh cellulose using a brush. The amount of cellulose coated on each side was about 1-2 grams per square foot. The cellulose coated sheets of EPDM were then placed in a 6"×6"×0.060" steel mold and cured for four (4) hours at 300°-320° F. The mold was then cooled, opened and the cellulose coated cured EPDM sheets were removed. There was no sticking of the elastomer surfaces to the surfaces of the steel mold.

RUN #2

A trial run was conducted by passing an 0.060" thick sheet of an EPDM elastomer of the Nordel type through a V-shaped trough containing #200 mesh particulate cellulose in two passes to apply a coating of cellulose to each surface of the EPDM sheet. The EPDM sheet was coated with cellulose on both sides at a level of about 1 gram of cellulose per square foot of sheeting. The cellulose coated EPDM sheet was then rolled onto a mandrel, placed in a large autoclave and cured for four (4) hours at 300°-320° F. The roll of cellulose coated cured EPDM sheet was then unrolled to evaluate the effectiveness of cellulose in preventing sticking together of the elastomer surfaces. On unrolling, the EPDM sheet showed no evidence of sticking or adhering of the elastomer surfaces.

A similar run was conducted using talc instead of cellulose to obtain a material to serve as a control for peel adhesion testing.

Peel Adhesion of Talc Coated Cured EPDM Sheets Vs. Cellulose Coated Cured EPDM Sheets In this comparative evaluation, the peel adhesion of lap splices formed by bonding two (2) 6"×6"×0.060" sheets of talc coated cured EPDM using a contact adhesive was compared to the peel adhesion of lap splices formed by bonding two (2) 6"×6"×0.060" sheets of cellulose coated cured EPDM using the same contact adhesive. Test samples were prepared without prior removal of the talc or cellulose coatings and also with pretreatments of the elastomer surfaces to remove the coating using various solvents and mechanical removal procedures.

The peel adhesion strips were generally prepared by applying a coating of contact adhesive over a 3"×4" area of the surface of each cured EPDM sheet to be bonded using a 1" wide paint brush. The adhesive coated surfaces were then allowed to dry until they were just tacky to the touch. The adhesive coated surfaces were then brought into contact with each other and manually pressed together. Then, pressure was applied to the test strip by rolling the lap splice with a 2"×2" diameter steel roller. The test strips were then allowed to age for various periods of time at various temperatures before testing for peel adhesion. It should be noted that in those cases where an attempt was made to remove the talc or cellulose coating, this was done before application of the contact adhesive.

The contact adhesive employed in the evaluation was a composition composed of a neutralized zinc sulfonated EPDM elastomer having from about 10 to about 100 milliequivalents of neutralized sulfonate groups per 100 grams of terpolymer, an organic hydrocarbon solvent or mixture of an organic hydrocarbon solvent and an aliphatic alcohol, a para-alkylated phenol formaldehyde and an alkylphenol or ethoxylated alkylphenol. The contact adhesive is described in copending application Ser. No. 431,403, now U.S. Pat. No. 4,450,252, of J. W. Fieldhouse, filed Sept. 30, 1982, commonly assigned to the assignee herein, the disclosure of which is incorporated herein by reference.

Peel adhesion, reported in pounds per linear inch (PLI), was conducted at room temperature (i.e., 22° C.) on test strips aged for seven (7) days at various temperatures. Peel adhesion was performed on an Instron tester operating at 2" per minute using the T peel adhesion test described in ASTM D-413. Identification of the surface coating used on the elastomer surfaces bonded together to form the test strip, surface preparation for removal of the surface coating if any and peel adhesion conditions and results are shown in the Table.

TABLE

| Test # | Surface Coating | Surface Preparation | Peel Adhesion, PLI @ 22° C. After Aging 7 Days @ °C. | | | |
|---|---|---|---|---|---|---|
| | | | 22 | 50 | 70 | 120 |
| 1 | talc | none | 1-2 | — | — | — |
| 2 | talc | gasoline only | 3 | 5 | 3.5 | 2.5 |
| 3 | talc | gasoline + sand blasting | 6.5 | 8 | 4 | 1.5 |
| 4 | cellulose | none | 7.5 | 7.5 | 6.0 | 4.0 |
| 5 | cellulose | gasoline + nylon brush | 10.5 | 14.0 | 13.0 | 9.0 |

We claim:
1. A method of reducing the surface tack of an EPDM elastomer which comprises coating the surfaces of the EPDM elastomer with particulate cellulose.
2. The method of claim 1 wherein said particulate cellulose has a particle size which will enable it to pass through a number 200 mesh screen.
3. The method of claim 1 wherein said EPDM elastomer is coated by dusting or brushing.
4. The method of claim 1 wherein said EPDM elastomer is coated by passing a sheet of the elastomer through a container filled with particulate cellulose.
5. An article comprising an EPDM elastomer having its surfaces coated with particulate cellulose.
6. The article of claim 5 wherein said EPDM elastomer is in the form of a sheet.
7. The article of claim 5 wherein said EPDM elastomer is in the form of a roll.
8. The article of claim 5 wherein said EPDM elastomer is cured or uncured.

* * * * *